United States Patent
Sandbank

[11] 3,977,762
[45] Aug. 31, 1976

[54] OPTICAL COUPLER

[75] Inventor: Carl Peter Sandbank, Bishop's Stortford, England

[73] Assignee: International Standard Electric Corporation, New York, N.Y.

[22] Filed: Sept. 5, 1974

[21] Appl. No.: 503,217

[52] U.S. Cl. .......................... 350/96 WG; 350/96 C
[51] Int. Cl.² ............................................. G02B 5/14
[58] Field of Search............ 350/96 WG, 96 B, 96 C

[56] References Cited
UNITED STATES PATENTS

| | | | |
|---|---|---|---|
| 3,141,105 | 7/1964 | Courtney-Pratt.............. | 350/96 B X |
| 3,347,649 | 10/1967 | Singer, Jr. ...................... | 350/96 B X |
| 3,498,864 | 3/1970 | Ogle .............................. | 350/96 B X |
| 3,621,138 | 11/1971 | McNaney ....................... | 350/96 B X |
| 3,719,462 | 3/1973 | Andreatch, Jr. et al. . | 350/96 WG X |
| 3,728,521 | 4/1973 | Borough et al................ | 350/96 B X |
| 3,817,730 | 6/1974 | Uchida ...................... | 350/96 WG X |

OTHER PUBLICATIONS

Goell, "Electron–Resist Fabrication of Bends and Couplers for Integrated Optical Circuits" *Applied Optics*, vol. 12, No. 4, pp. 729–736, Apr., 1973.

*Primary Examiner*—John K. Corbin
*Assistant Examiner*—Stewart Levy
*Attorney, Agent, or Firm*—John T. O'Halloran; Peter Van Der Sluys; Thomas M. Marshall

[57] ABSTRACT

An optical waveguide coupler made by integrated optical circuit techniques is employed to direct light from a document to be copied to a line of photosensors of a large scale integrated photosensor module. A plurality of optical waveguides are spaced widely along the document and closely along the photosensor array. Spaced channels are formed in a higher refractive index glass layer on a glass substrate. The higher index layer glass provides the plurality of optical waveguides separated by the channels.

1 Claim, 4 Drawing Figures

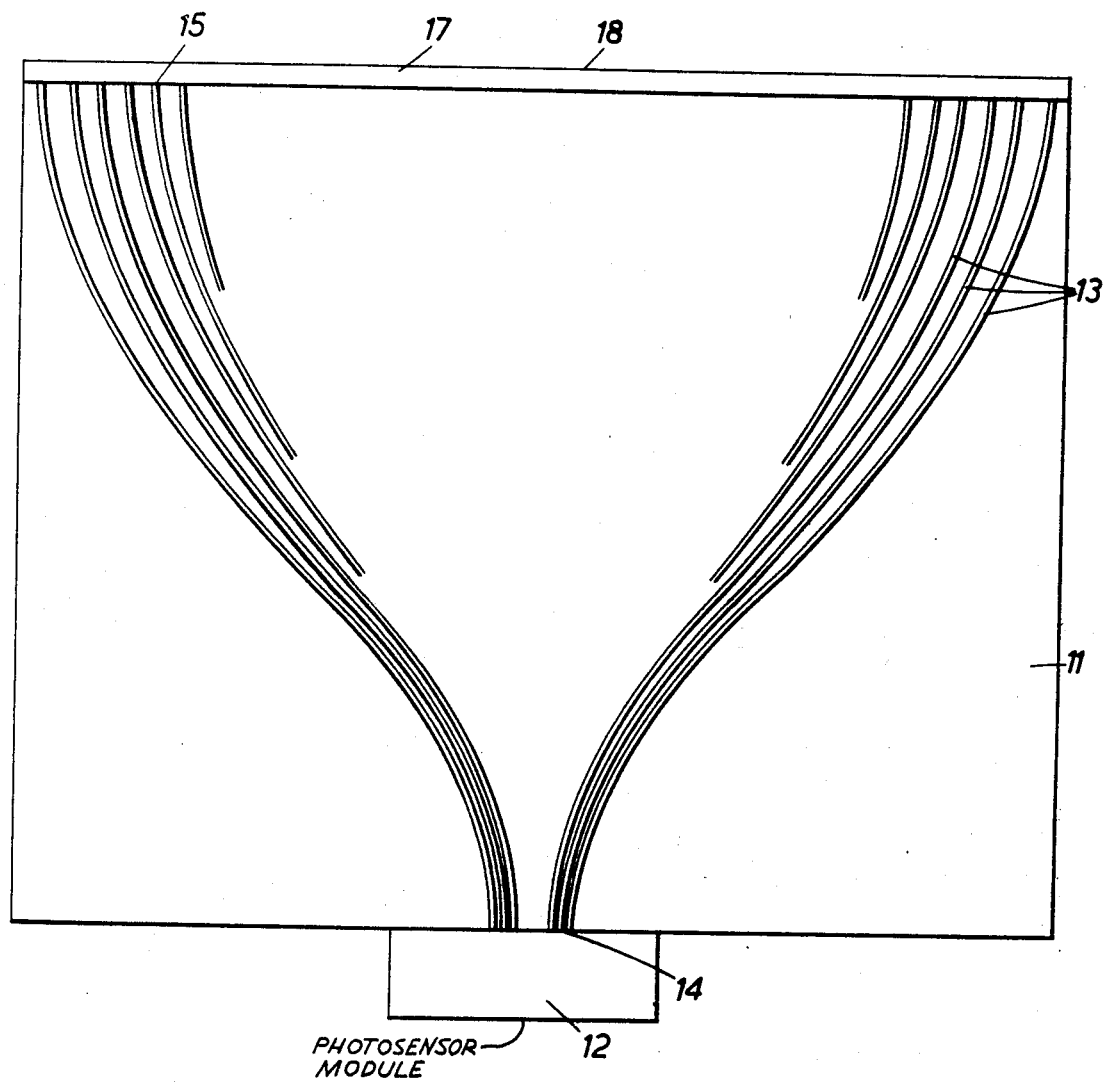

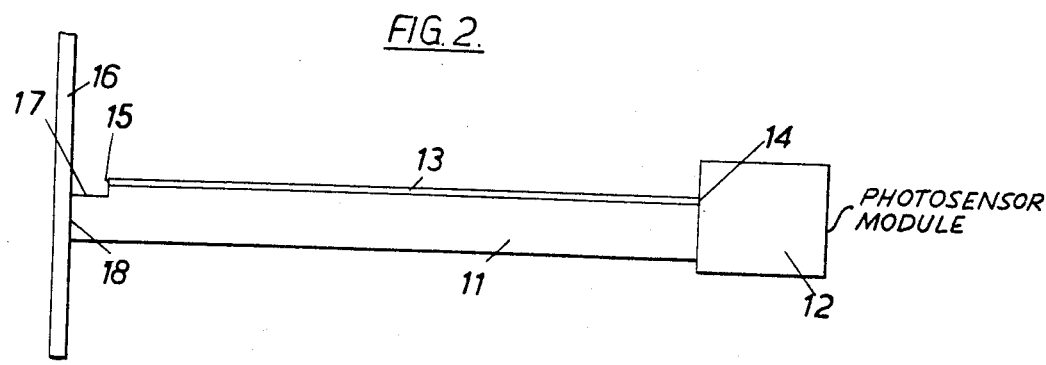
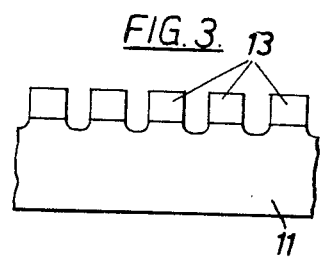
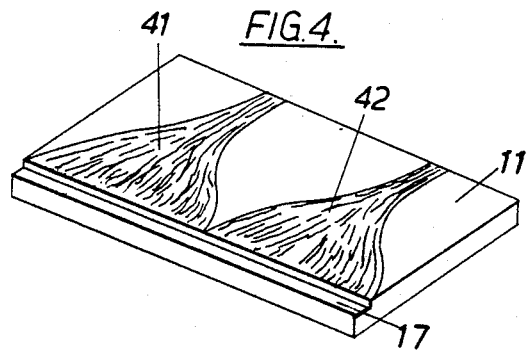

OPTICAL COUPLER

BACKGROUND OF THE INVENTION

1. Field of the Invention

This invention relates to optical couplers and finds particular but not necessarily exclusive application in facsimile.

2. Description of the Prior Art

In facsimile apparatus, a coupler formed of a plurality of optical waveguides may be used in place of a lens for sequential imaging of portions of a document to be copied upon a scanned linear array of photosensors. This type of coupler may also be used in situations where the requisite imaging can not be achieved with a single lens. This sort of situation occurs when the requisite number of photosensors can not be mounted in a single unbroken line. For instance, if the requisite number of picture points exceeds the number of photosensors in an integrated circuit module, the array of photosensors may be formed by mounting two or more modules end to end. Normally, the construction of such modules is such that the photosensors do not extend right to the side edges of such modules and hence the assembly will have breaks in the array of photosensors at the junctions between adjacent modules.

SUMMARY OF THE INVENTION

It is therefore the object of the present invention to provide a novel optical coupler between a document to be copied and a photosensor array using integrated circuit techniques.

According to the invention there is provided an optical waveguide coupler including a substrate in which or on which are formed a plurality of optical waveguides extending across the substrate, their one ends being arranged side by side at equispaced intervals and their other ends being arranged side by side at smaller equispaced intervals.

The optical coupler also includes optical waveguides whose one ends are arranged side by side at equispaced intervals but whose other ends are arranged side by side in groups with equispaced intervals between the individual members of each group, but with greater spacings between adjacent members of adjacent groups. It is not necessary for all the groups to be supported upon a common substrate and indeed it may be more convenient to have a separate substrate for each group. The optical waveguides are formed on or in a substrate by integrated circuit techniques such as selective etching of a sputtered or otherwise deposited layer, or a method of creating the waveguides in the substrate by ion implantation.

There follows a description of a coupler embodying the invention in a preferred form as part of a facsimile apparatus. The description refers to the accompanying drawings.

BRIEF DESCRIPTION OF THE DRAWINGS

FIG. 1 depicts a plan view of a coupler together with an associated large scale integrated circuit photosensor module. (The representation of the layout of the optical waveguides in this figure is only schematic since they are far too numerous to be individually represented);

FIG. 2 depicts a side elevation of the coupler, showing also the location of the photosensor module and a document to be copied;

FIG. 3 depicts a partial view of the end of the coupler adjacent the photosensor module, and FIG. 4 is a perspective representation of a modified form of coupler designed for use with two photosensor modules instead of one.

DESCRIPTION OF THE PREFERRED EMBODIMENTS

The coupler now to be described is designed for a facsimile system accomodating documents of up to 5 or 10 inches in width at a resolution of 100 points per inch. For the 5 inch version, light from the picture points is guided to large scale integrated circuit module 12 provided with a monolithic silicon photodiode array of 512 photodiodes at 0.001 inch centres, whereas for the 10 inch width version it is guided to a pair of such modules. The arrays are self scanned by metal-oxide-semiconductor shift counters formed in the same silicon chips as their associated photodiodes.

The coupler consists of a glass substrate 11 on which a layer of glass of higher refractive index than that of the substrate is deposited by R.F. sputtering. Using standard photolithographic masking techniques a pattern of channels is etched through this sputtered glass layer delineating a set of optical waveguides 13. It may be noted that it is not necessary to use a selective etch because the depth of the channels is not significant so long as they are deep enough to penetrate into the substrate underlying the sputtered glass layer.

The waveguides are 0.0006 inch wide, and at their ends 14 adjacent the photodiodes of an integrated circuit photosensor module 12 are at 0.001 inch centres, while at their other ends 15 they are at 0.010 inch centres. At the end adjacent the photodiodes, the waveguides should be brought as close as possible to the diodes so that each diode receives light only from its own associated waveguide. If, on the other hand the ends 15 come into contact with a document to be copied 16, then each waveguide will accept light from a restricted region corresponding in size and shape to the end of the guide. This makes the system particularly vulnerable to spurious signals resulting from small scale imperfections in the surface of the document 16. This defect is remedied by spacing the ends of the waveguides a short distance from the document so that each accepts light from a larger area of the document. Preferably, the spacing is arranged so that these areas shall not overlap significantly. This spacing is provided by etching a step 17 along the edge 16 of the substrate. When therefore the document 16 to be copied is placed in contact with the edge 18 of the substrate 11, it will then be a predetermined distance from the ends 15 of the waveguides.

The waveguides may be straight and be arranged to fan out radially. However by permitting the waveguides to have gentle curves in their length they may be arranged to terminate normally with respect to the edges of the substrate so that there is no occasion to take account of any obliquity factor in their collection of light from the document to be copied.

FIG. 4 shows how for the 10 inch width version involving the use of two integrated circuit modules 10 the guides are arranged in two groups 41 and 42.

It is to be understood that the foregoing description of specific examples of this invention is made by way of example only and is not to be considered as a limitation on its scope.

What is claimed is:

1. An optical waveguide coupler for transferring light from an object at one end to a light responsive element at an opposite end comprising:
- a glass substrate;
- a layer of glass on the surface of said substrate, said glass layer having a higher index of refraction than said substrate glass;
- a plurality of optical waveguides on said substrate, said waveguides formed from said high index glass and separated from each other by a series of channels etched through said glass layer and into said substrate, said channels providing a series of equi-spaced intervals, each of said waveguides immediate a pair of said intervals;
- said intervals at said opposite end of said coupler being spaced closer together than at said one end of said coupler to direct light from a surface area proximate said one end to a corresponding smaller surface at said opposite end; and
- a stepped channel formed at said one end of said coupler extending parallel to said one end and perpendicular to said waveguides, said stepped channel thereby separating the end of said waveguides proximate said one end from any object positioned at said one end of the coupler.

* * * * *